United States Patent [19]
Koike

[11] Patent Number: 5,149,287
[45] Date of Patent: Sep. 22, 1992

[54] SEPARATE OILING SYSTEM FOR OUTBOARD MOTOR

[75] Inventor: Takashi Koike, Hamamatsu, Japan

[73] Assignee: Sanshin Kogyo Kabushiki Kaisha, Hamamatsu, Japan

[21] Appl. No.: 705,291

[22] Filed: May 24, 1991

[30] Foreign Application Priority Data

May 24, 1990 [JP] Japan ................................. 2-132480

[51] Int. Cl.$^5$ ............................................ B63H 21/10
[52] U.S. Cl. ................. 440/88; 123/196 R; 123/196 S
[58] Field of Search .......... 440/88; 123/196 R, 196 S, 123/198 C, 198 D

[56] References Cited

U.S. PATENT DOCUMENTS 4,708,674 11/1987 Matsumoto ........................... 440/88

Primary Examiner—Sherman Basinger
Attorney, Agent, or Firm—Ernest A. Beutler

[57] ABSTRACT

A lubricating system for an outboard motor having a lubricant delivery tank mounted on the outboard motor and which is replenished by a pumping system from a separate lubricant storage tank contained within the hull of an associated watercraft. The circuit for controlling the pump includes a trim angle sensor that is mounted on the lubricant delivery tank for preventing operation of the pump when a trim angle change would incorrectly indicate a need for the addition of lubricant to the lubricant delivery tank.

9 Claims, 5 Drawing Sheets

SEPARATE OILING SYSTEM FOR OUTBOARD MOTOR

BACKGROUND OF THE INVENTION

This invention relates to a separate oiling system for an outboard motor, and more particularly to an improved arrangement for precluding malfunction in the case that the trim angle of the outboard motor adversely affects the lubricating system.

It has been proposed to provide a separate form of lubricating system for an outboard motor that employs a large lubricant reservoir that is mounted externally of the outboard motor and within the hull of the associated watercraft. A smaller lubricant delivery tank is mounted on the outboard motor and supplies lubricant directly to the engine lubricating system. It has been proposed to provide a float operated switch arrangement for operating an external pump so as to replenish the lubricant delivery tank from the lubricant storage tank when the level of the lubricant delivery tank falls below a predetermined amount and to stop the pump when the lubricant level reaches the desired level in the delivery tank. As is well known, however, outboard motors are operated at a variety of trim angles and occasionally when tilted up out of the water. When this occurs, the lubricant level in the delivery tank will change and normally a lower lubricant level is indicated than actually present. If the separate pump is operated, then the level of lubricant in the delivery tank will be too high when the outboard motor is returned to its normal trim condition and problems can occur.

It has, therefore, been proposed to provide a trim angle indicative switch that is in indicative of the trim angle of the outboard motor and which disables the pumping system when the trim angle is changed to such a degree that the normal lubricant level sensor in the delivery tank will not provide an appropriate signal. Although these types of devices are satisfactory, there are certain difficulties in connection with them.

That is, it is difficult to provide a trim angle sensor that will actually sense the change of trim of the lubricant tank. If the sensor is mounted separately from the lubricant tank, as is typical, then it is difficult to mount the sensor in a location on the outboard motor that will actually be indicative of the condition in the delivery tank. In addition, the types of mountings previously employed have resulted in complicated circuitry and not always accurate conditions.

It is, therefore, a principal object of this invention to provide a separate lubricating system of the type described having a trim angle circuit that is controlled by a trim angle sensor that senses the actual trim angle of the lubricant tank.

It is a further object of this invention to provide an improved trim angle sensing detector for a separate lubricating system for an outboard motor.

SUMMARY OF THE INVENTION

This invention is adapted to be embodied in an outboard motor that is adapted to be mounted on a transom of a watercraft for tilt and trim movement. The outboard motor includes a power head having an internal combustion engine. A lubricant tank for containing lubricant for the operation of the engine is carried by the outboard motor. A trim condition sensor is fixed to the lubricant tank for sensing a change in the trim of the lubricant tank and protective circuit means are provided for initiating protective action when the trim condition detects a predetermined trim change of the lubricant tank.

DETAILED DESCRIPTION OF THE PREFERRED EMBODIMENT OF THE INVENTION

Figure 1:
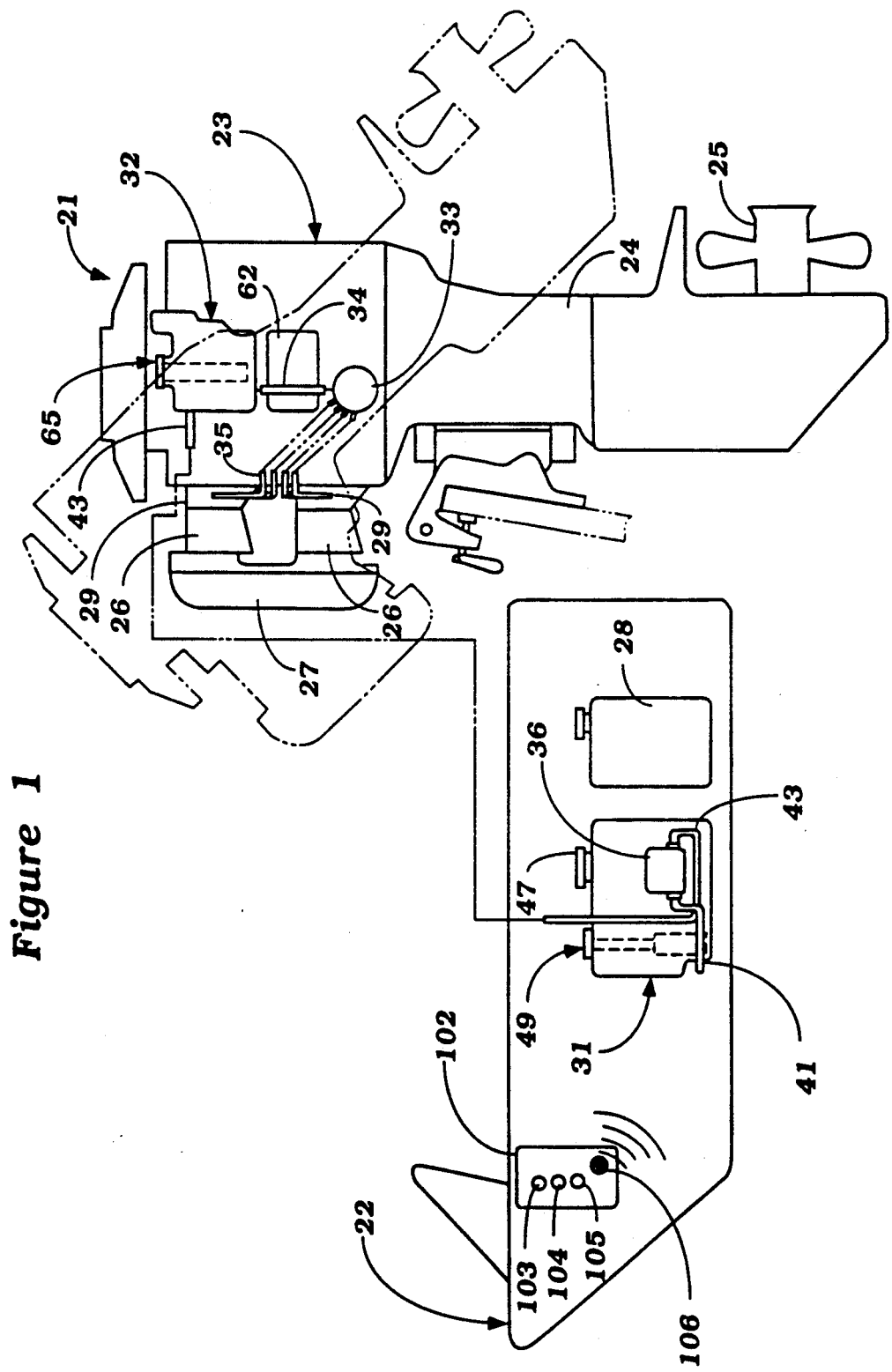
FIG. 1 is a partially schematic side elevational view of a watercraft and attached outboard motor having a lubricating system constructed in accordance with an embodiment of the invention. The outboard motor is shown in a normal position in solid lines and in a trim adjusted position in phantom lines.

Referring first to FIG. 1, an outboard motor having a separate lubricating system constructed in accordance with an embodiment of the invention is identified generally by the reference numeral 21. The outboard motor 21 is adapted to be mounted on the transom of an associated watercraft, shown partially schematically and indicated generally by the reference numeral 22 in a known manner. This mounting arrangement permits steering movement of the outboard motor 21 about a vertically extending steering axis and tilting movement about a generally horizontally extending tilt axis between a normal running condition, a plurality of trim adjusted positions and a tilted up, out-of-the-water position.

The outboard motor 21 includes a power head consisting of an internal combustion engine 23 which, as will be noted, is of the crankcase compression two-cycle type and which may have any type of cylinder configuration. In order to more clearly show the construction, the protective cowling which normally encircles the internal combustion engine 23 has been removed and is not shown in the drawings. The engine 23 includes a driven crankshaft, which is illustrated in certain of the remaining figures, which in turn drives a drive shaft that extends through a drive shaft housing 24 and which drives a propeller 25 in a suitable manner, which may include via a forward/reverse/neutral transmission. The engine 23 includes an induction system consisting of one or more carburetors 26 that receive air from an air intake device 27 and fuel from a remotely positioned fuel tank 28 in a known manner for delivery to the individual crankcases of the engine 23 through an intake manifold 29 and appropriate reed valves (not shown). This general construction of the outboard motor and its induction system is not shown in any detail because it may be of any conventional type.

In accordance with the invention, the outboard motor 21 and specifically its engine 23 is provided with a separate lubricating system so that it will be unnecessary for the operator to mix lubricant with the fuel supplied to the fuel tank 28. This separate lubricating system is comprised of a relatively large lubricant storage tank 31 that is adapted to be positioned within the hull of the watercraft 22. The lubricating system further includes a relatively small lubricant delivery tank 32 that is mounted directly to the outboard motor 23, in a manner to be described, and which is positioned within the protective cowling of the power head. Lubricant is delivered from the lubricant delivery tank 32 to a lubricant pump 33 through a conduit 34. The lubricant pump 33 then transfers the lubricant under pressure through a plurality of conduits 35 to each of the individual runners of the intake manifold 29 that serve the respective crankcase chambers of the engine 23. Since, in the illustrated embodiment, the engine 23 is of the V-4 type, there are four lubricant delivery conduits 35 each extending from the lubricant pump 33 to a respective one of the runners of the intake manifold 29.

Figure 3:
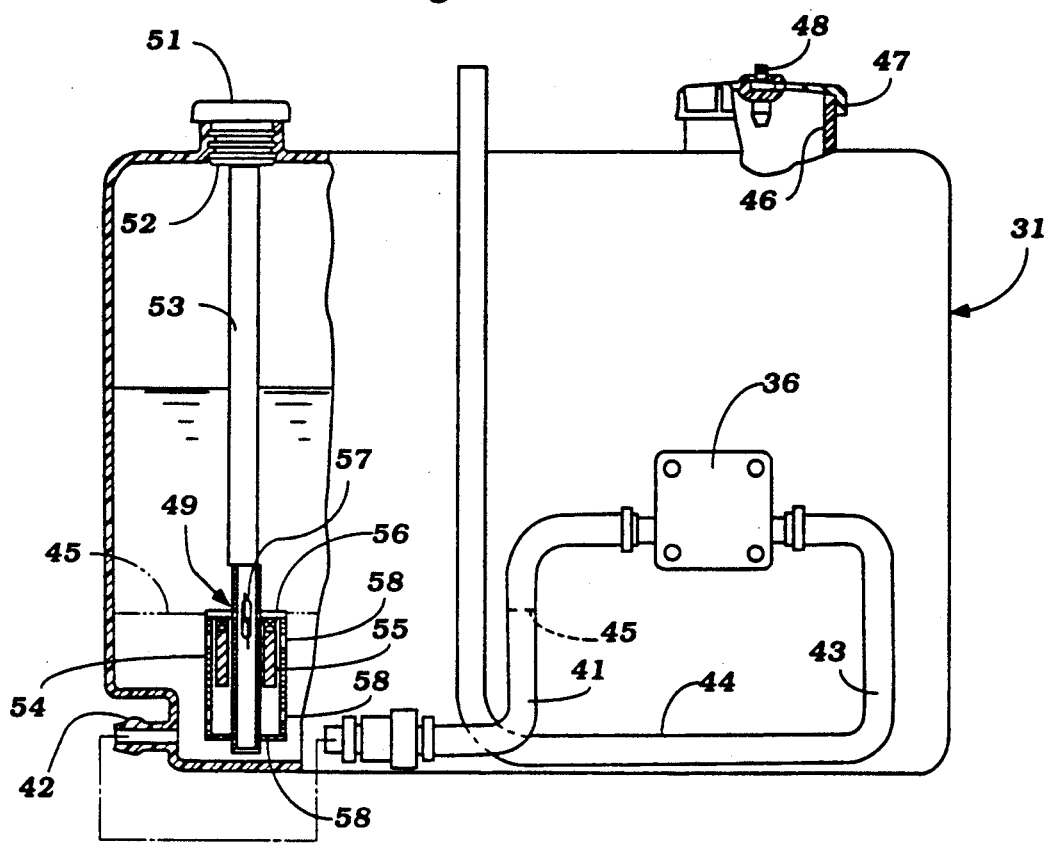
FIG. 3 is an enlarged side elevational view of the lubricant storage tank, with portions broken away so as to more clearly show the construction.

Referring now additionally to FIG. 3, the lubricant storage tank 31; as has been noted, has a relatively large capacity and is adapted to be positioned in the hull of the watercraft 22. Lubricant is delivered from the storage tank 31 to the delivery tank 32 by means of a pump 36 that is mounted externally of the tank 31 in a suitable manner. The pump 36 is of the positive displacement type and is driven by an electric motor which is not shown in this figure, but which is indicated by the reference numeral 39 in the schematic wiring diagram FIG. 7. Lubricant is delivered to the pump 36 by a lubricant delivery line 41 that extends to an inlet nipple 42 that is positioned in a lower wall of the lubricant storage tank 31. The lubricant pump discharges from the pump 36 through a delivery conduit 43 that extends to the lubricant delivery tank 32. The delivery conduit 43 is provided with a U-shaped trap 44 so as to insure the presence of lubricant at both the inlet and outlet sides of the pump 36 even when the level of lubricant in the tank 31 is at a low condition. This level is shown by the broken line 45 in FIG. 3. It should be noted that the lubricant pump 36 is above this level. The pump 36 is positioned above the bottom of the storage tank 31 so that it is less likely to be contaminated by debris which may accumulate on the floor of the hull of the watercraft 22. Even though the pump 36 is positioned above the lower level of the tank 31, the trap 44 insures that a level of lubricant to the line 45 will also be maintained in the outlet and inlet sides of the pump 36 so that if the pump is operated even with the lubricant at the level 45, the pump will not run dry.

The storage tank 31 is provided with a filler neck 46 that is closed by a cap 47 so that the quantity of lubricant in the tank 31 may be periodically replenished. A check valve type air relief or venting valve 48 is positioned in the cap 47 so as to permit air to be admitted to the tank 31 as the level of lubricant falls during operation.

A sensing device, indicated generally by the reference numeral 49, is provided so as to issue a caution signal, in a manner to be described, when the level in the tank 31 falls to or below the level 45. This sensing device 49 is carried by a cap-like member 51 that is received in a threaded opening 52 in an upper wall of the tank 31. A support rod of tubular configuration 53 extends from the cap-like member 51 into the interior of the tank 31 and carries an annular shell 54 at its lower end. Contained within this annular shell is a float 55 that is movable from an uppermost position to a lowermost position. The float 55 carries a magnet 56 that is adapted to cooperate with a sensing member or switch 57 carried by the tube 53 so as to close a circuit, in a manner to be described, as long as the level of lubricant in the storage tank 31 is above a predetermined level. If, however, the level falls below the level indicated by the line 45, the magnet 56 will move out of contact with the switch 57 and this switch will then be opened.

It should be noted that the shell 54 is positioned at the lowermost portion of the tank 31 and thus the float 55 can never rise above the line 45. In addition, restricted openings 58 extend through the wall of the shell 54 so as to permit lubricant to enter the interior of the shell at a somewhat restricted rate. This will insure that the float 55 will not cause inadvertent opening of the switch if the level of lubricant in the tank 31 is low, but nevertheless varies due to sudden maneuvering of the watercraft 22. In this way, false caution signals will be avoided.

Figure 2:
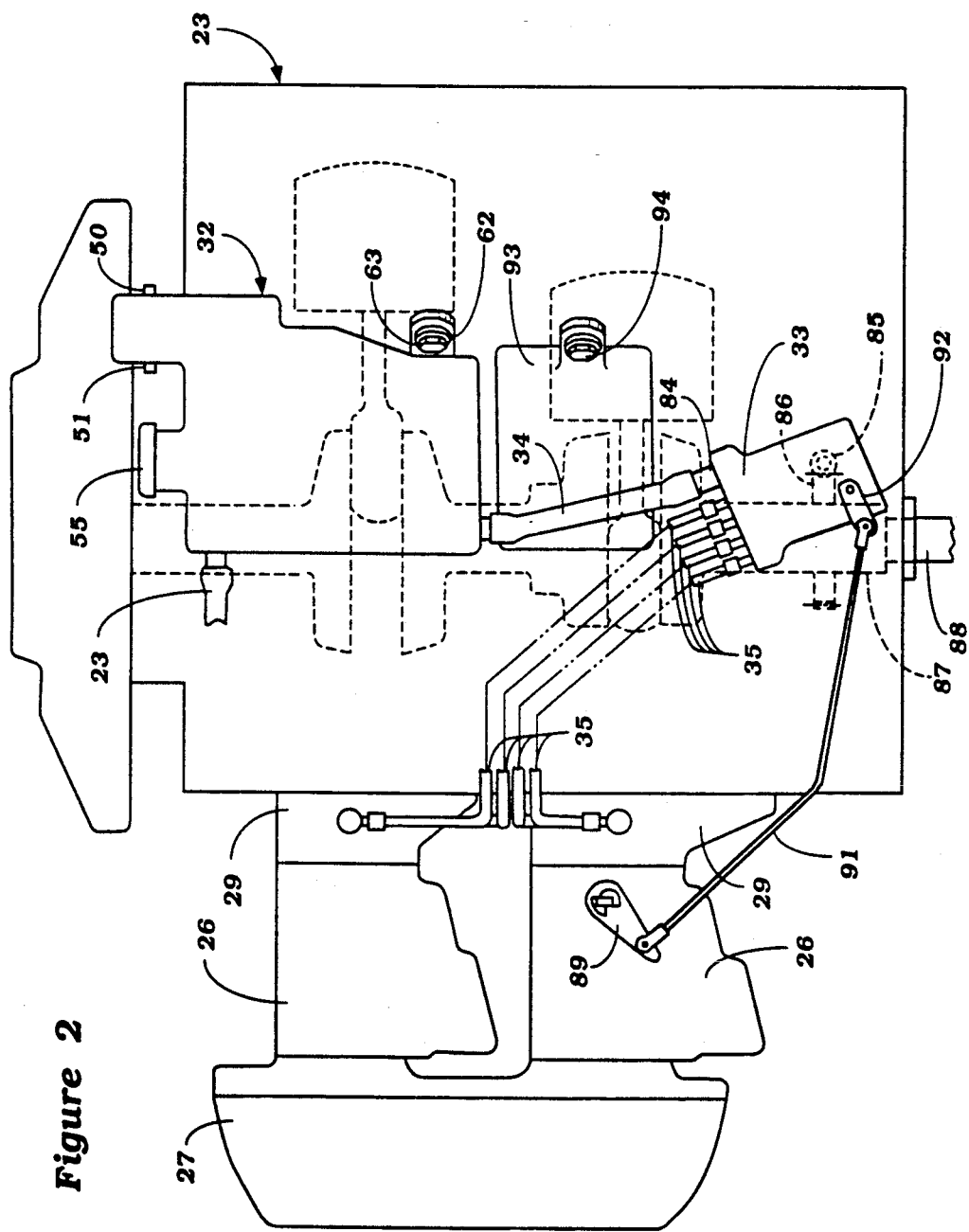
FIG. 2 is an enlarged side elevational view of the engine and lubricating system of the outboard motor.
Figure 4:
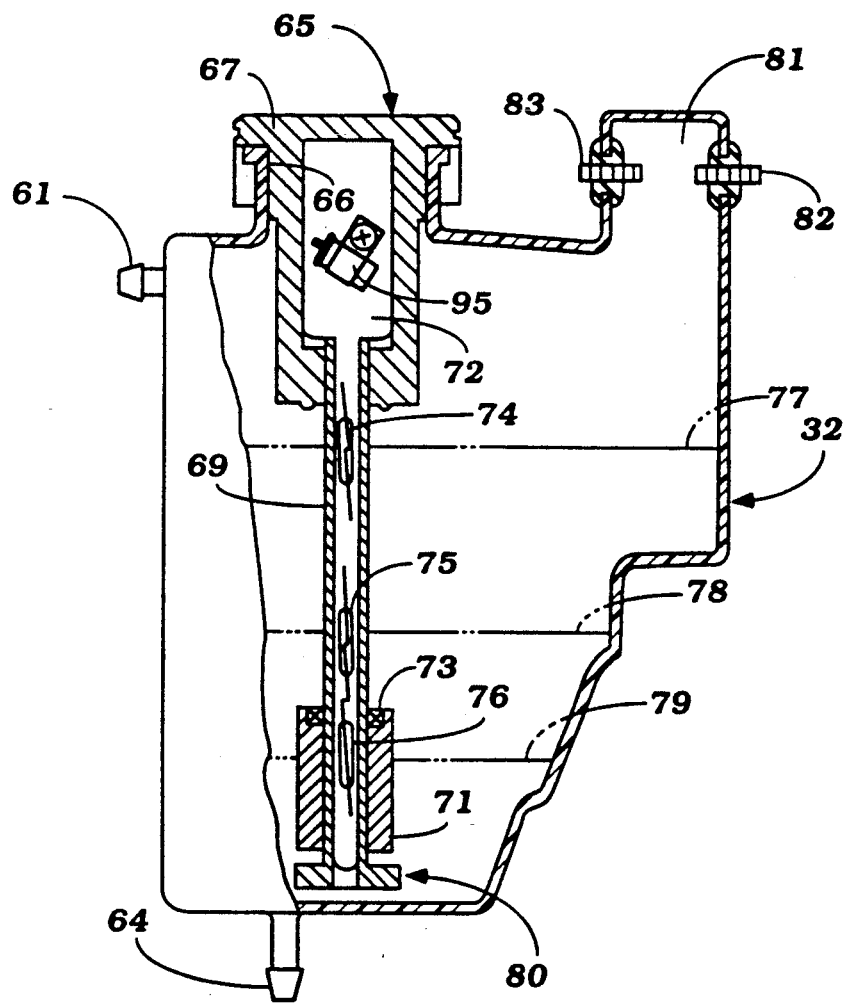
FIG. 4 is an enlarged side elevational view of the lubricant delivery tank, with portions broken away so as to more clearly show the construction.

Referring now additionally to FIG. 4, the construction of the lubricant delivery tank 32 and its associated components will be described. The lubricant delivery conduit 44 communicates with a quick disconnect coupling that is connected to an inlet nipple 61 formed in the upper side of the lubricant delivery tank 32. The delivery tank 32 is, in turn, mounted on the cylinder block of the engine 23 by means including a mounting bracket 62 and bolt 63 (FIG. 2). The lower end of the lubricant delivery tank 32 is provided with an outlet nipple 64 to which the conduit 34 is connected so as to transfer lubricant from the delivery tank 32 to the lubricant pump 33.

A sensing and control device, indicated generally by the reference numeral 65, is provided which is mounted in a neck opening 66 formed in an upper surface of the delivery tank 32. The sensing device 65 includes a cap 67 from which depends a tube 69. An annular float 71 encircles the tube 69 so that the float 71 will move to a level that is determined by the level of fluid in the tank 32.

The float 71 carries an annular magnet 73 that is adapted to cooperate with one of three switching elements 74, 75 and 76 carried by a plate 72 supported within the tube 69 so as to provide control and warning signals. The switch 74, as will become apparent, provides a signal when the level of lubricant in the supply tank 32 is at a maximum line, indicated by the broken line 77, so as to discontinue operation of the motor 39 and pump 36. The switch 75 cooperates with the magnet 73 so as to provide a signal when the lubricant level reaches a lower level indicated by the line 78 so as to initiate operation of the motor 39 and pump 36 so as to replenish the lubricant in the delivery tank 32. The switch 76 cooperates with the magnet 73 so as to provide a warning signal when the lubricant level reaches a low level indicated by the line 79 in a manner which will be described. A stop 80 retains the sleeve 71 on the tube 69.

In order to permit air to enter and leave the delivery tank 32 in response to changes in liquid level therein, its upper wall is formed with an upwardly extending recess 81 and check valves 82 and 83 are provided which communicate the recess 81 with the atmosphere so as to permit air to flow in a controlled manner in and out of the supply tank 32. The valve 83 permits air to enter and the valve 82 permits air to exit.

Referring now additionally to FIG. 2, the lubricant pump 33 has an inlet nipple 84 that communicates with the conduit 34 so that lubricant will be delivered by gravity from the delivery tank to the pump 33. The pump 33 has a driving shaft to which a worm gear 85 is affixed. The worm gear 85 is enmeshed with a worm wheel 86 that is fixed for rotation with the lower end of the previously mentioned crankshaft 87 immediately above its driving connection with a drive shaft 88. Hence, the lubricating pump 33 is driven in response to the rotation of the crankshaft 87.

The output of the lubricating pump 33 is adjusted in response to throttle position and for this purpose a lever 89 is affixed to the throttle valve shaft of one of the carburetors 26. The lever 89 is pivotally connected to one end of a link 91, the other end of which is pivotally connected to a control lever 92 of the pump 33. Hence, movement of the carburetor throttle valves will, through the lever 89, link 91 and control lever 92, appropriately control the amount of lubricant delivered from the pump 33 to the manifold runners through the conduits 35.

The electrical control system for the lubricating system and its interrelationship to the engine speed control will now be described. The control circuit is depicted schematically in FIG. 7 and incldues a number of components that are positioned within a control box, indicated generally by the reference numeral 93 and which is mounted on the cylinder block of the engine 23 by means of a bolt or the like 94 (FIG. 2).

Figure 5:
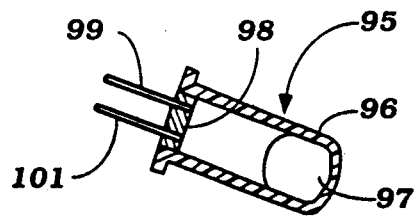
FIG. 5 is a cross-sectional view of the trim condition switch of FIG. 4 showing the normal operating condition.
Figure 6:
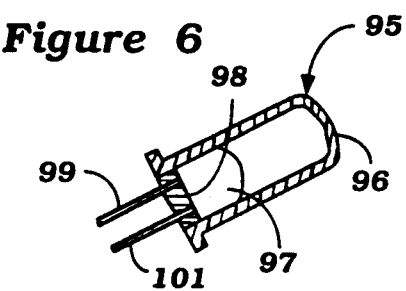
FIG. 6 is a cross-sectional view, in part similar to FIG. 5, and shows an abnormal trim condition when protective operation is required.

Supported on the upper end of the plate 73 within the lubricant delivery tank 32 is a tank trim position sensing device, indicated generally by the reference numeral 95 and shown in most detail in FIGS. 5 and 6. The tank trim position sensing device 95 is a mercury type switch and includes a body 96 in which a globule of mercury 97 is contained. The body 96 is closed by an insulating cap 98 from which a pair of terminals 99 and 101 extend. When the outboard motor 21 is in its normal running condition, as shown in FIGS. 1 and 5, the globule of mercury 97 will be spaced from the terminals 99 and 101 and the circuit will then be open. However, when the motor 21 is tilted up, the sensing device 95 will be rotated to the position shown in FIG. 6 and the mercury globule 97 will close the circuit between the terminals 99 and 101.

Figure 7:
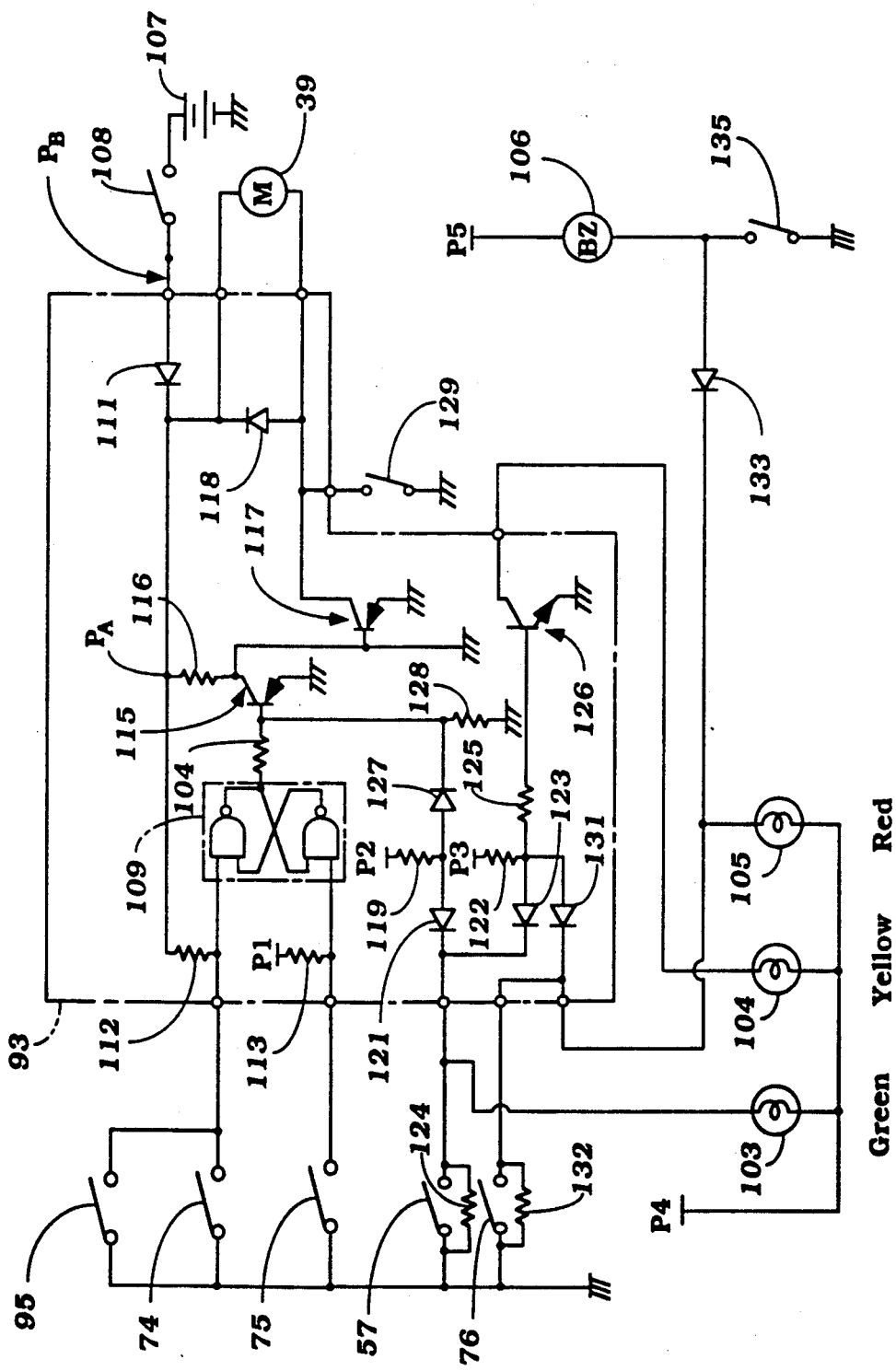
FIG. 7 is an electrical schematic view showing the operation of the lubrication system and the protective components therefor.

Referring now additionally to FIG. 7, the system includes a panel 102 (FIG. 1) that is positioned in the watercraft 22 and which includes a green, system on light 103, a yellow warning light 104 and a red caution light 105. In addition, the panel 102 further carries a warning buzzer 106 that provides an audible warning under the caution condition, as will become apparent.

The circuit, as shown in FIG. 7, includes a power source such as a battery 107 that has one side grounded and its other side connected to a main power control switch 108, which may also be juxtaposed on the panel 102, if desired. Closure of the switch 108 will energize the points PB, P1, P2, P3, P4 and P5 through suitable junctions (not shown). When the main control switch 108 is closed and if there is sufficient lubricant in the storage tank 31, the switch consisting of the contact 57 and float controlled magnet 56 will be closed and the green "on" light 103 will be illuminated.

Assuming that that level of lubricant in the delivery tank 32 is also adequate so that the float 71 will be positioned between the contacts 74 and 75, these contacts 74 will be open as shown in FIG. 7. Also, if the trim of the outboard motor 21 and specifically the delivery tank 32 is normal so as to not adversely affect the lubricant level therein, the switch 95 will also be open. Under this condition, a flip flop 109 will be maintained in a "1" condition so that the power delivered to its one terminal through a diode 111 and resistor 112 and the power delivered to its other terminal from the point P1 through a resistor 113 will output an output voltage through a resistor 114 to the gate of a transistor 115 so that the transistor 115 will be maintained in an "on" condition. When the transistor 115 is on, the circuit from the point PA containing resistor 116 will be grounded and the gate of a transistor 117 will be negative so that the transistor 117 will be off and no voltage will be supplied to the motor 39 and the pump 36 will not be operated. It should be noted that a diode 118 is positioned across the circuit of the motor 39.

As the motor 21 and specifically its internal combustion engine 23 continues to operate, the lubricant pump 33 will deliver lubricant from the delivery tank 32 to the engine induction system through the delivery conduits 35. This will cause the level of lubricant in the delivery tank 32 to be gradually depleted until it reaches the level 78 (FIG. 4). At this time, the magnet 73 will come into registry with the switch 75 so as to close its circuit. The source P1 will now discharge through the resistor 113 to ground and change the state of the flip flop 109 to its "0" state. When this occurs, the gate of the transistor 115 is affected so as to turn the transistor "off." Turning of the transistor 115 off changes the state of the gate of the transistor 117 and it will now turn "on" closing the circuit through the motor 39 so as to energize it and the pump 36.

As the pump 36 begins to operate, lubricant will be drawn from the supply tank 31 and delivered to the delivery tank 32 through the conduit 41. As the lubricant is delivered, the float 71 will raise and again move the magnet 73 out of registry with the switch 75 so as to open it. However, this will not change the state of the flip flop 109 and the transistor 115 will be maintained switched "off" and the transistor 117 will be maintained switched "on" so that the motor 39 and pump 36 will continue to operate.

As the level in the delivery tank 32 continues to increase, it will eventually reach the level 77 (FIG. 4) and bring the magnet 73 into registry with the switch 74. This switch will now close and shunt the line bearing the resistor 112 to ground and thus change the state of the flip flop 109 back to its "1" state. This will cause the transistor 115 to be switched on and the transistor 117 to be switched off so that the motor 39 and pump 36 are turned off. The level of lubricant in the delivery tank 32 will then again begin to deplete and this cycling of the motor 39 and pump 36 as described will continue during the operation of the motor 21 and specifically its engine 23.

It should be noted that if for some reason the motor 21 is tilted up from its normal condition, the position responsive switch 95 will close so that transistor 117 cannot be turned on and the motor 39 and pump 36 will not be energized even if the contact 75 is opened. Also, the green light 103 will be maintained in its illuminated condition during this entire operation.

If, during long periods of cruising, the lubricant in the supply tank 31 becomes depleted below the minimum desired line 45, the float 55 will move downwardly so that its magnet 56 no longer contacts the switch 57 and thus will, in effect, open this otherwise normally closed switch. When the switch 57 is closed, current from the source P2 will go to the ground through this switch through a resistor 119 and diode 121. In a like manner, current from the source P3 will go to ground through the resistor 122 and diode 123. However, when the switch 57 opens due to lowering of the float 55, a protecting resistor 124 across the switch 57 offers sufficient resistance so as to cause the power from the source P3 to be delivered through a resistor 125 to the gate of a transistor switch 126 to turn this normally closed switch on and render it conductive. When the transistor switch 126 is switched on, current from the source P4 flows through the yellow caution light 104 and will cause it to become illuminated. Thus, the operator of the watercraft 22 will receive a warning indicating that the lubricant level in the supply tank 31 is low and that it should be replenished.

Opening the switch 57 also causes current from the source P2 to no longer flow through the diode 121 due to the high resistance of the resistor 124. Therefore, current from the source P2 will flow through the resistor 119 and a diode 127 to ground through a resistor 128 so as to switch the transistor 115 on and the transistor 117 off so that the operation of the motor 39 and pump 36 will also be discontinued.

It should be noted that the yellow caution light 104 is switched on and the motor 39 and pump 36 automatically stopped before the level of lubricant in the supply tank 31 falls to its fully depleted condition. Thus, the caution light 104 will go on before the lubricant in the supply tank 31 is depleted and at a time when the level of the lubricant in the delivery tank 32 is above its level 78. Therefore, adequate warning of a low supply lubricant condition will be given to the operator.

In the event of emergency conditions, the operator may switch on the motor 39 and pump 36 so as to transfer the remaining lubricant from the storage tank 31 to the delivery tank 32. This is done by closing a manual override switch 129 in the circuit of the motor 39 which then causes the motor to operate independently of the condition of the transistor switch 117.

Assuming that the level of lubricant in the supply tank 31 has fallen below the line 45 and the motor 21 is continued to be operated, the level of lubricant in the delivery tank 32 will, of course, continue to be depleted. When the level falls to the line 79, which is still above the point when the amount of lubricant in the delivery tank 32 is completely exhausted, the float magnet 73 will register with the switch 76 and will turn it on. When the switch 76 is switched on and remembering that the switch 57 is switched off, current from the source P3 may flow through a diode 131 to the ground through the closed switch 76. As a result the transistor 126 is again switched off and the yellow caution light 104 will also be switched off. It should be noted that there is a high resistance protective resistor 132 positioned across the switch 76 to protect it from arcing upon opening of the switch.

When the switch 76 is closed, a circuit from the source P5 through the warning buzzer 106 will be completed to the ground through the switch 76 and a diode 133. This will cause the buzzer 106 to give an audible warning to the operator. In addition, closure of the switch 76 will complete the circuit from the source P4 through the red warning light 105 to the ground and this also will be illuminated.

It should be readily apparent from the foregoing description that the described system is particularly effective in insuring protective action of the lubrication system when the trim of the lubricant delivery tank is changed to a position wherein such protective action is required. It should be readily apparent, however, that the described embodiment is only one arrangement in which the trim condition switch may be mounted in the lubricant delivery tank and various other changes and modifications may be made without departing from the spirit and scope of the invention, as set forth in the appended claims.

I claim:

1. An outboard motor adapted to be mounted on a transom of a watercraft for tilt and trim movement, said outboard motor including a power head having an internal combustion engine, a lubricant tank for containing lubricant for the operation of said engine carried by said outboard motor, a trim condition sensor carried by said lubricant tank for sensing a change in the trim of said lubricant tank, and protective circuit means for initiating protective action when said trim condition sensor senses a predetermined trim change of said lubricant tank.

2. An outboard motor as set forth in claim 1 wherein the trim condition sensor is contained within the lubricant tank.

3. An outboard motor as set forth in claim 1 further including sensor means for sensing the level of the lubricant within the lubricant tank and for controlling a circuit associated therewith.

4. An outboard motor as set forth in claim 3 wherein the trim condition sensor is contained within the lubricant tank.

5. An outboard motor as set forth in claim 4 wherein the trim sensor and the lubricant level sensor are both carried by the same support.

6. An outboard motor as set forth in claim 5 wherein the lubricant level sensor controls a pump for supplying lubricant to the lubricant tank.

7. An outboard motor as set forth in claim 6 wherein the pump supplies lubricant to the lubricant tank from an externally positioned lubricant storage tank.

8. An outboard motor as set forth in claim 7 wherein the protective circuit prevents operation of the pump when the predetermined trim change is sensed.

9. An outboard motor as set forth in claim 5 wherein the support comprises a member depending into the lubricant tank from an opening in the upper end therein and wherein the trim condition sensor is positioned above the liquid level in the lubricant tank when the outboard motor is in a normal condition.

* * * * *